United States Patent [19]

Loos et al.

[11] 4,202,520
[45] May 13, 1980

[54] MODULAR SUPPORT ASSEMBLY FOR TUBES

[75] Inventors: John F. Loos; James C. Petty, both of San Diego, Calif.

[73] Assignee: UOP Inc., Des Plaines, Ill.

[21] Appl. No.: 927,707

[22] Filed: Jul. 24, 1978

[51] Int. Cl.² ............................................. F16L 3/22
[52] U.S. Cl. .............................................. 248/68 CB
[58] Field of Search ............... 248/68 CB, 49, 67.5, 248/68 R; 138/106, 112; 211/194; 312/111

[56] References Cited

U.S. PATENT DOCUMENTS

| | | | |
|---|---|---|---|
| 429,041 | 5/1890 | Lynch | 138/106 |
| 764,028 | 7/1904 | Alford | 211/194 |
| 2,683,578 | 7/1954 | Rainey | 248/68 R |
| 3,133,753 | 5/1964 | Goodman et al. | 138/106 |
| 3,526,934 | 9/1970 | Owen | 248/68 CB |
| 3,856,246 | 12/1974 | Sinko | 248/68 CB |
| 3,881,314 | 5/1975 | Hennig et al. | 248/49 |
| 4,095,698 | 6/1978 | Wright | 312/111 |
| 4,099,626 | 7/1978 | Magnussen, Jr. | 248/68 CB |

Primary Examiner—Francis K. Zugel
Attorney, Agent, or Firm—James R. Hoatson, Jr.; Barry L. Clark; William H. Page, II

[57] ABSTRACT

A support assembly is disclosed which is especially useful for supporting a plurality of tubular members such as the steel or fiberglass pressure tube assemblies used in a reverse osmosis water purification system. A molded, cast, extruded or pultruded hollow module element is formed with flat sides and a concave cylindrical tube receiving surface so that a plurality of modules can be stacked vertically and/or horizontally to support any desired number of tubes. Apertures in the flat sides permit the modular elements to be quickly attached and aligned to each other by nut and bolt or other type fastener elements. Various modifications of the shape and size of the modules permit the support by a single module of one-fourth of one tube, one-half of one tube, or one-half of each of two tubes.

5 Claims, 4 Drawing Figures

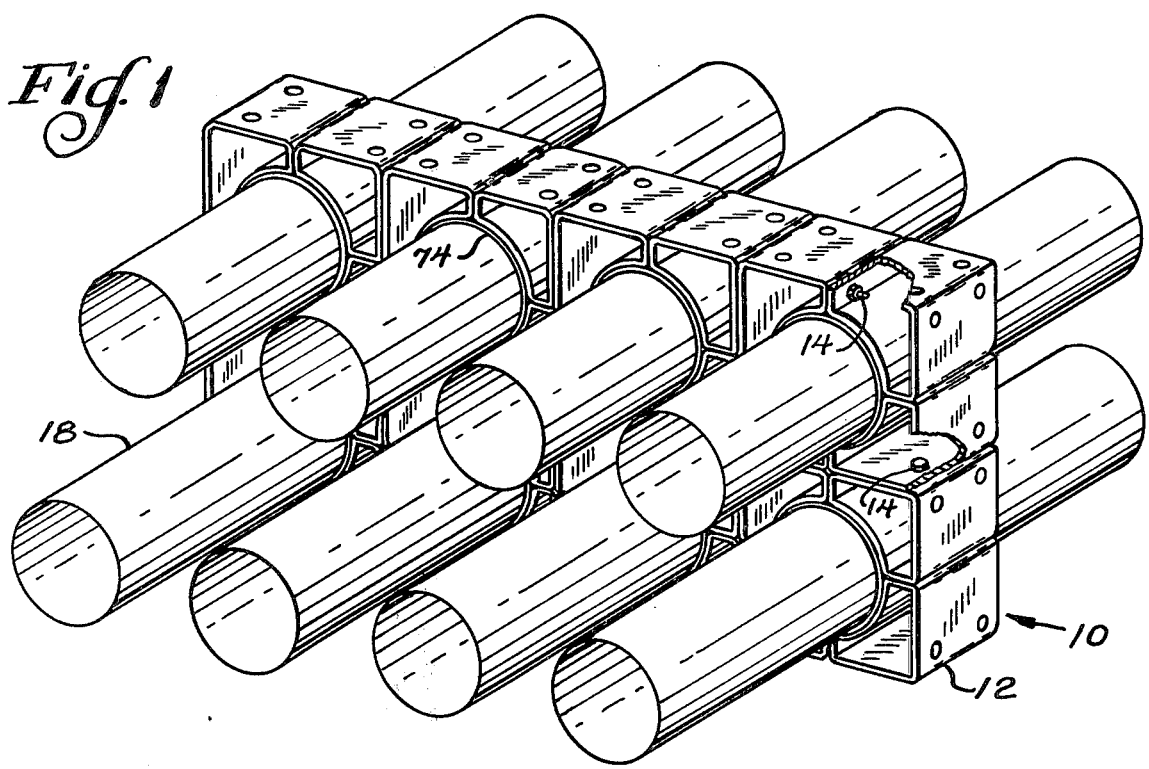
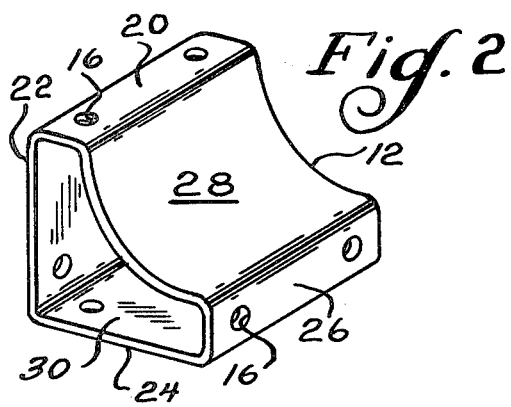
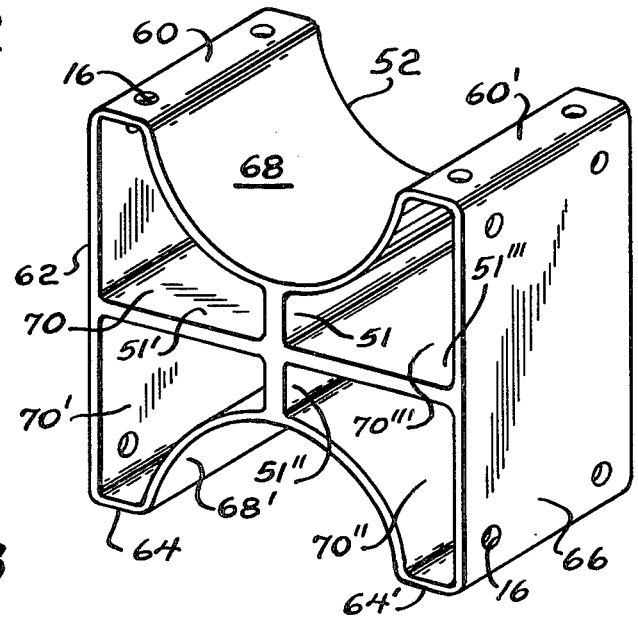
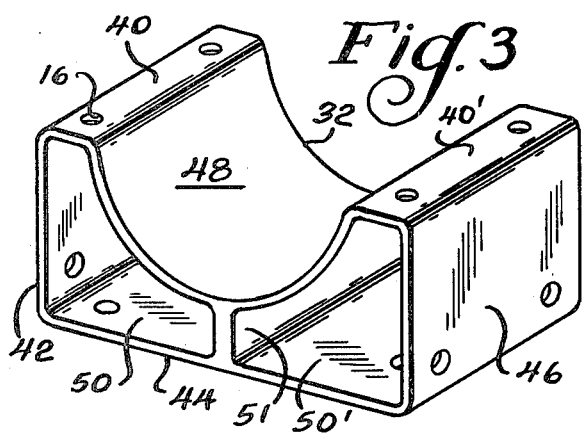

MODULAR SUPPORT ASSEMBLY FOR TUBES

BACKGROUND OF THE INVENTION

The invention relates to tube support structures and particularly to support structures of the type used to stack a large number of pressure tube assemblies for a reverse osmosis water purification system at a fixed distance from each other. Conventionally, pressure tube racks must be designed to order for each system and fabricated of structural steel followed by application of a corrosion resistant coating since the tubes are used in handling sea water or aggressive water. Such a procedure is quite costly and time consuming.

SUMMARY OF THE INVENTION

It is among the objects of the present invention to provide a support assembly which is economical to produce, which can be instantly accommodated to support any number of tubes desired in an installation, and which will resist the corrosion which is a problem with metal supports located in areas close to bodies of salt water or where aggressive water is being handled. The improved support assembly is fashioned from a plurality of modules which may be formed of any suitable material, including various metals or plastics, but are preferably formed of fiber reinforced plastic, FRP, either by casting, molding or extruding individual module members or by the pultrusion process where an elongated member of indefinite length is formed and cured and then cut into a plurality of pieces of the desired length. The latter process is preferred. One embodiment of the invention is of a shape which is adapted to engage about one-fourth of the circumference of a tube, thus necessitating the use of four modules for each tube. Other modifications constitute double or quadruple versions of the aforementioned module wherein what would be two separate contacting walls if two basic modules were joined together comprises an internal rib member which reinforces the hollow interior of the larger modules. The aforementioned double or quadruple modified modules, respectively, will support about one-half of one tube or about one-half of each of two tubes. Apertures are uniformly positioned in the flat sides of the modules, the apertures being adapted to align with complementary apertures in adjacent modules so that fasteners may be used to assemble the modules into a rigid stack configuration. To accommodate for manufacturing tolerances, elastomeric strips may be placed between the contacting surfaces of the modules and the tubes held thereby.

BRIEF DESCRIPTION OF THE DRAWINGS

FIG. 1 is an isometric view showing a plurality of modular support elements assembled together to support a plurality of tube members;

FIG. 2 is an isometric view showing the configuration of one of the basic support modules utilized in FIG. 1;

FIG. 3 is a modification of the design of FIG. 2 which can support one-half the circumference of a tube; and FIG. 4 is a modification of the embodiments of FIGS. 2 and 3 which can support one-half the circumference of each of two different tubes.

DESCRIPTION OF THE PREFERRED EMBODIMENT

Referring to FIG. 1, a support assembly 10 is illustrated which comprises a stacked arrangement of individual module members 12 which are fastened together by nut and bolt or other fastening means 14 which are located in integral apertures 16. Depending upon how many modules 12 are assembled together the assembly will have a varying capacity to support a plurality of tube members 18.

FIGS. 2 through 4 illustrate a plurality of module shapes 12, 32 and 52 which can respectively accommodate one-quarter of the circumference of a tube 18, one-half of the circumference of the same tube or one-half of the circumference of each of two such tubes 18. The FIG. 2 embodiment has the advantage that it is quite simple and therefore the tooling required to make it would be much less expensive than for the far more complicated design of FIG. 4. However, the FIG. 4 design has the advantage that it requires much less assembly time during installation since it has approximately four times the capacity of the basic module 12.

Referring to FIG. 2, the module 12 has four generally flat planar side portions 20, 22, 24 and 26 which are adapted to contact similar surfaces on adjacently positioned modules. The surfaces 20 and 26 have a relatively small width and are joined by a concave cylindrical surface 28 which is adapted to contact approximately one-fourth of the circumference of one of the tubes 18. The interior of the module 12 is hollow as shown at 30 in order to lessen the weight of the structure and permit access to the aforementioned fasteners 14 which are located in apertures 16. The four flat wall portions 20-26 all lie on the locus of a rectangle drawn in a transverse cross-sectional plane through the axis of the module 12.

FIG. 3 illustrates a modification which is essentially a unitary combination of two modules 12 which have been joined together along their common walls 26. The module 32 has flat side wall portions 40-40', 42, 44 and 46 with the wall portions 40-40' being interrupted by the semi-cylindrical wall portion 48 which is adapted to accommodate about one-half the circumference of a tube 18. The internal wall portion 51 strengthens the module and divides it into a pair of hollow interior compartments 50, 50'. Similarly to the module 12, the module 32 has its flat external walls 40-46 arranged at right angles to each other and lying on the locus of a rectangle drawn in a transverse cross-sectional plane through the axis of the module element.

FIG. 4 is essentially of the same shape as if a pair of the elements 32 of FIG. 3 were turned in opposite directions so that their common walls 44 were joined. Thus, the modules 52 comprise flat wall portions 60-60', 62, 64-64', and 66. The upper and lower walls 60-60' and 64-64' are interrupted by semi-cylindrical wall portions 68, 68' which can each accommodate approximately one-half the circumference of one of the tubes 18. The interior of module 52 is strengthened by internal integral wall or web portions 51, 51', 51", and 51''' which divide the interior into four hollow compartments 70, 70', 70", and 70'''.

As can be readily appreciated the rectangular, preferably square in the case of modules 12 and 52, configuration of the modules permits the modules to be stacked very uniformly. Where the tubes 18 have a 6" diameter, the modules 12 preferably have a length and width of about 6". The modules must be of sufficient strength to support the load to which they are subjected. We have found that they perform quite satisfactorily for an array of pressure tube assemblies each having a diameter of about 6" and arranged in a configuration which is 8 wide and 8 high where each pressure tube weighs approximately 500 pounds and has a length of about 20 feet. In such a situation, the tubes are preferably supported intermediate their ends at three locations by an assembly of modules 10. To allow for manufacturing tolerances in both the tubes and the modules, shims or pads 74 of a suitable elastomeric material may be placed between the modules and the tubes or a suitable elastomeric coating may be applied to one or both of the contacting surfaces.

We claim as our invention:

1. A modular support assembly apparatus for supporting a plurality of elongated tubes in spaced vertical and/or horizontal relationship to each other which comprises a plurality hollow, molded, modular elements having apertures in the wall portions thereof, wherein said apertures are aligned with identical apertures in another adjacently positioned modular support element, said adjacent elements being adapted to rigidly attach to one another by fastening means transversing said apertures, each said modular support element having four flat rigid external planar surfaces positioned to form three right angles and a concave cylindrical external wall surface portion connecting two of said four planar surfaces having its concave shape formed to engage not more than one-quarter of the circumference of said elongated tube supported thereby.

2. The support assembly of claim 1 wherein the cross-section of the rigid wall portions defines a hollow square except for one corner which is of a concave cylindrical configuration.

3. The support assembly of claim 1 wherein said module elements are cut-off portions of a length of a fiber reinforced plastic pultrusion.

4. The modular element of claim 1 wherein the external surfaces of the planar portions lie in the locus of a square rectangle.

5. The modular element of claim 1 wherein said concave cylindrical portion has a peripheral extent which comprises no more than one-fourth of the circumference of a complete cylinder having the same radius.

* * * * *